US008090489B2

(12) United States Patent
Delean

(10) Patent No.: US 8,090,489 B2
(45) Date of Patent: Jan. 3, 2012

(54) COMPUTERIZED DRIVERLESS VEHICLES AND TRAFFIC CONTROL SYSTEM

(76) Inventor: Bruno Delean, Andorra La Vela (AD)

(\*) Notice: Subject to any disclaimer, the term of this patent is extended or adjusted under 35 U.S.C. 154(b) by 1045 days.

(21) Appl. No.: 11/983,443

(22) Filed: Nov. 9, 2007

(65) Prior Publication Data

US 2009/0125174 A1    May 14, 2009

(51) Int. Cl.
*G05D 1/02* (2006.01)
(52) U.S. Cl. .......................................... 701/24; 340/468
(58) Field of Classification Search .................... 701/24, 701/23, 25, 22, 19, 28, 300, 301, 41, 213; 340/988, 468, 436; 318/587, 573; 180/401
See application file for complete search history.

(56) References Cited

U.S. PATENT DOCUMENTS

| | | | |
|---|---|---|---|
| 3,946,825 A | 3/1976 | Gail | |
| 4,819,169 A | 4/1989 | Saitoh et al. | |
| 5,049,802 A * | 9/1991 | Mintus et al. | 320/107 |
| 5,363,027 A | 11/1994 | Noguchi | |
| 5,923,270 A * | 7/1999 | Sampo et al. | 340/988 |
| 6,049,745 A * | 4/2000 | Douglas et al. | 701/23 |
| 6,061,613 A * | 5/2000 | Zyburt et al. | 701/24 |
| 6,085,131 A | 7/2000 | Kim | |
| 6,150,961 A | 11/2000 | Alewine et al. | |
| 6,151,539 A * | 11/2000 | Bergholz et al. | 701/25 |
| 6,212,453 B1 | 4/2001 | Kawagoe et al. | |
| 6,489,887 B2 | 12/2002 | Satoh et al. | |
| 6,577,946 B2 | 6/2003 | Myr | |
| 6,879,889 B2 * | 4/2005 | Ross | 701/22 |
| 7,167,799 B1 | 1/2007 | Dolgov et al. | |
| 7,174,836 B2 | 2/2007 | Marino et al. | |

(Continued)

FOREIGN PATENT DOCUMENTS

JP    2003-345439    * 12/2003

OTHER PUBLICATIONS http://en.wikipedia.org/wiki/Driverless_car, Nov. 2007.

(Continued)

*Primary Examiner* — Thomas Black
*Assistant Examiner* — Marthe Marc-Coleman
(74) *Attorney, Agent, or Firm* — Soquel Group LLC

(57) ABSTRACT

A transportation system, including a network of roads for traveling to and from various destinations, a plurality of vehicles for transporting passengers, each vehicle situated within the network of roads, and each vehicle including a power supply, a positioning system, for identifying the position of the vehicle, a transmitter, coupled with the positioning system, for transmitting position and velocity information of the vehicle to other vehicles in its vicinity, a receiver for receiving position and velocity information from other vehicles in the vicinity of the vehicle, and an automatic steering system, coupled with the receiver, for steering the vehicle through the network of roads without collision, in order (i) to travel to a destination designated by the at least one passenger, when the vehicle is transporting the at least one passenger, (ii) to travel to a source for picking up the at least one passenger, when the vehicle is empty and the power supply is not low, and (iii) to travel to an available docking station, when the vehicle is empty and the power supply is low, and a plurality of docking stations, each docking station situated at a roadside of the network of roads, and each docking station including a charger for charging the power supply of a vehicle that is docked at the docking station.

11 Claims, 4 Drawing Sheets

U.S. PATENT DOCUMENTS

| | | |
|---|---|---|
| 7,236,884 B2 | 6/2007 | Matsumoto et al. |
| 7,242,817 B2 | 7/2007 | Takeda et al. |
| 7,266,453 B2 | 9/2007 | Sawamoto et al. |
| 7,561,948 B2 * | 7/2009 | Gaegauf et al. .................. 701/19 |
| 2007/0021915 A1 * | 1/2007 | Breed et al. ................... 701/301 |
| 2009/0299563 A1 * | 12/2009 | Mikosza ......................... 701/25 |

OTHER PUBLICATIONS http://en.wikipedia.org/wiki/DARPA—Grand_Challenge, Nov. 2007.

* cited by examiner

COMPUTERIZED DRIVERLESS VEHICLES AND TRAFFIC CONTROL SYSTEM

FIELD OF THE INVENTION

The present invention relates to driverless vehicles and transportation systems.

BACKGROUND OF THE INVENTION

A summary and history of driverless vehicles is available at Wikipedia (http://en.wikipedia.org/wiki/Driverless_car). As described at Wikipedia, "The driverless car concept embraces an emerging family of highly automated cognitive and control technologies, ultimately aimed at a full 'taxi-like' experience for car users, but without a human driver.... The work done so far varies significantly in its ambition and its demands in terms of modification of the infrastructure. Broadly, there are three approaches. The first group ... is the fully autonomous vehicles ... which are the most ambitious, but none are deployed. The second approach uses various enhancements to the infrastructure (either an entire area, or specific lanes) to create a self-driving closed system. Such systems already function in many airports, on railroads, and in some European towns. The third approach is to incrementally remove requirements from the human driver, by various 'assistance' systems. This approach is slowly trickling into standard cars (e.g. improvements to cruise control) .... Fully autonomous ... technologies are the most ambitious: They allow a car to drive itself following a pre-set target, until it gets there all on its own .... The final goal of safe door-to-door transportation in arbitrary environments is not yet reached though."

SUMMARY OF THE DESCRIPTION

The present invention concerns a transportation system using driverless vehicles to efficiently transport passengers back and forth to their various destinations, within a network of roads. Embodiments of the present invention apply to closed environments, such as an airport or a village.

Features of the present invention include color-coded cones on roofs of vehicles, which encode position and velocity information of the vehicles. Neighboring vehicles may scan the color codes to identify other vehicles in their vicinities.

Features of the present invention also include visual patterns on road surfaces used for position identification. Moving vehicles scan the visual patterns to determine their positions within a network of roads.

Embodiments of the present invention include a centrally controlled transportation system, whereby individual vehicles receive steering instructions from a central traffic controller, an individually controlled transportation system, whereby individual vehicles independently control their steering, and a mixed transportation system with both central and individual steering control.

There is thus provided in accordance with an embodiment of the present invention a transportation system, including a network of roads for traveling to and from various destinations, a plurality of vehicles for transporting passengers, each vehicle situated within the network of roads, and each vehicle including a power supply, a positioning system, for identifying the position of the vehicle, a transmitter, coupled with the positioning system, for transmitting position and velocity information of the vehicle to other vehicles in its vicinity, a receiver for receiving position and velocity information from other vehicles in the vicinity of the vehicle, and an automatic steering system, coupled with the receiver, for steering the vehicle through the network of roads without collision, in order (i) to travel to a destination designated by the at least one passenger, when the vehicle is transporting the at least one passenger, (ii) to travel to a source for picking up the at least one passenger, when the vehicle is empty and the power supply is not low, and (iii) to travel to an available docking station, when the vehicle is empty and the power supply is low, and a plurality of docking stations, each docking station situated at a roadside of the network of roads, and each docking station including a charger for charging the power supply of a vehicle that is docked at the docking station.

There is further provided in accordance with an embodiment of the present invention a transportation system, including a network of roads for traveling to and from various destinations, a plurality of vehicles for transporting passengers, each vehicle situated within the network of roads, and each vehicle including a steering system for moving the vehicle along the network of roads in accordance with steering instructions, a power supply, a positioning system, for identifying the position of the vehicle, a transmitter, coupled with the positioning system, for providing position and velocity information of the vehicle to a central traffic controller, and a receiver, coupled with the guidance system, for receiving steering instructions from the central traffic controller for the steering system, a plurality of docking stations, each docking station situated at a roadside of the network of roads, and each docking station including a charger for charging the power supply of a vehicle that is docked at the docking station, and a central traffic controller, including a receiver for retrieving position and velocity information from the plurality of vehicles, a transmitter for transmitting steering instructions to the vehicle steering systems, and an automatic navigational system, coupled with the receiver, for instructing the steering systems of each of the plurality of vehicles how to navigate through the network of roads without collision, in order (i) to travel to a destination designated by the at least one passenger, when such vehicle is transporting the at least one passenger, (ii) to travel to a source for picking up the at least one passenger, when such vehicle is empty and its power supply is not low, and (iii) to travel to an available docking station, when such vehicle is empty and its power supply is low.

BRIEF DESCRIPTION OF THE DRAWINGS

The present invention will be more fully understood and appreciated from the following detailed description, taken in conjunction with the drawings in which.

DETAILED DESCRIPTION

The present invention relates to driverless transport systems.

Figure 1:
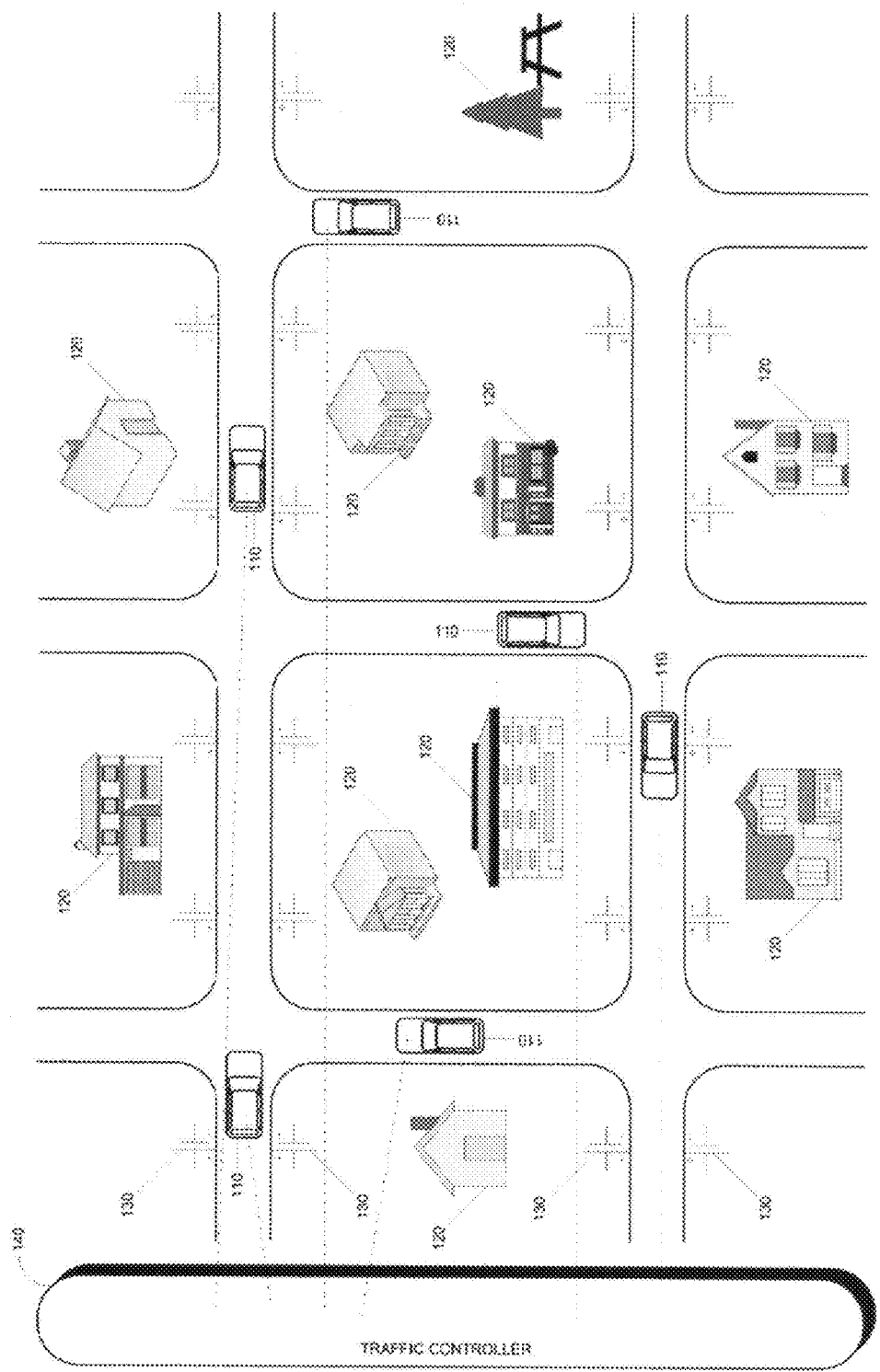
FIG. 1 is a driver-less urban transportation system, in accordance with an embodiment of the present invention.

Reference is now made to FIG. 1, which is a driverless urban transportation system, in accordance with an embodiment of the present invention. Shown in FIG. 1 is a network of roads on which a plurality of driverless vehicles 110 transport passengers to their various destinations 120. The network in FIG. 1 may be a network of roads within a city, and the destinations are buildings, parks and sites within the city to which people are transported back and forth. Alternatively, the network of FIG. 1 may be a network of roads at an airport, and the destinations may correspondingly be airplanes to which passengers are transported for boarding and unboarding. Alternatively, the network of FIG. 1 may be a network of conduits in a manufacturing plant, and the destinations may be various areas in the plant to which parts are transported.

Each vehicle 110 has a power supply that can be re-charged at any of a plurality of docking stations 130.

Vehicles 110 may be guided by a central traffic controller, or by individual traffic controllers within each vehicle. In the centrally controlled embodiment, vehicles 110 are guided by a traffic controller 140, similar to a flight control tower, which monitors traffic of the vehicles and transmits driving instructions to each vehicle, so as to avoid collisions.

In the individually controlled embodiment, each vehicle 110 has its own controller, which monitors traffic of other vehicles in its vicinity, and derives driving instructions to avoid collisions. Additionally, in a mixed control environment, vehicles 110 may be guided by both central traffic controller 140 and by their own individual controllers.

Figure 2:
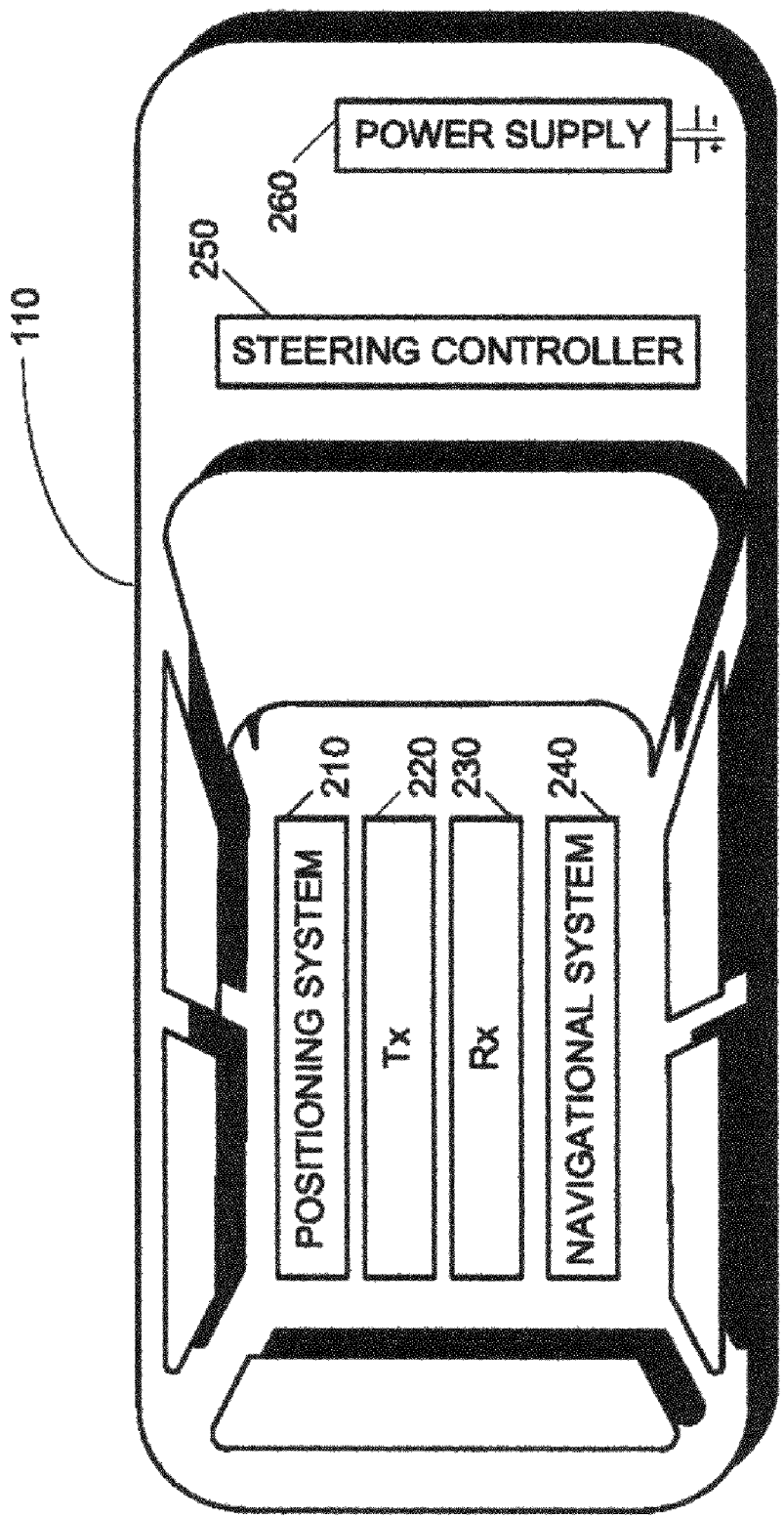
FIG. 2 is a simplified block diagram of a driver-less vehicle, in accordance with an embodiment of the present invention.

Reference is now made to FIG. 2, which is a simplified block diagram of a driverless vehicle, in accordance with an embodiment of the present invention. Shown in FIG. 2 is one of the vehicles 110 from FIG. 1, which is used to transport passengers to their designated destinations 120.

Positioning System 210

Vehicle 110 includes a positioning system 210, which dynamically identifies the position coordinates of vehicle 110 at each point in time. Position system 210 may use one or more of many technologies for determining the position of vehicle 110 and, as such, there are many alternative embodiments of positioning system 210 within the scope of the present invention.

In a first embodiment of the present invention, positioning system 210 is a global positioning system (GPS), which retrieves global position coordinates of vehicle 110 from one or more overhead satellites.

In a second embodiment of the present invention, positioning system 210 is a vision-based system, using visual patterns overlaid on the roads on which vehicle 110 is driving. The visual patterns encode position information, including inter alia an identifier of the road on which vehicle 110 is driving, and the present distance along the road, similar to mileage indicators on highways. In this embodiment, positioning system 210 includes a scanner, which scans the road surface underneath vehicle 110, and analyzes the pattern on the road to derive vehicle 110's current position within the network of roads. For example, the visual patterns may be in the form of bar codes, and positioning system 210 may include a bar code scanner.

Visual patterns may alternatively be provided as markers, such as radio frequency identification (RFID) tags, on the sides of the roads.

Position Transmitter 220

Vehicle 110 also includes a transmitter 220, which dynamically transmits its current position to traffic controller 140, in the centrally controlled embodiment; or to other vehicles in its vicinity, in the individually controlled embodiment; or to both in a mixed control environment. Generally, position transmitter 210 also transmits the velocity at which vehicle 110 is traveling. Position transmitter 220 may use one or more of many technologies for transmitting the position and velocity of vehicle 110 and, as such, there are several alternative embodiments of position transmitter 220 within the scope of the present invention.

In a first embodiment, transmitter 220 transmits vehicle 110's position and velocity information to traffic controller 140 or to other vehicles, or to both, as appropriate, using a radio transmitter.

Figure 3:
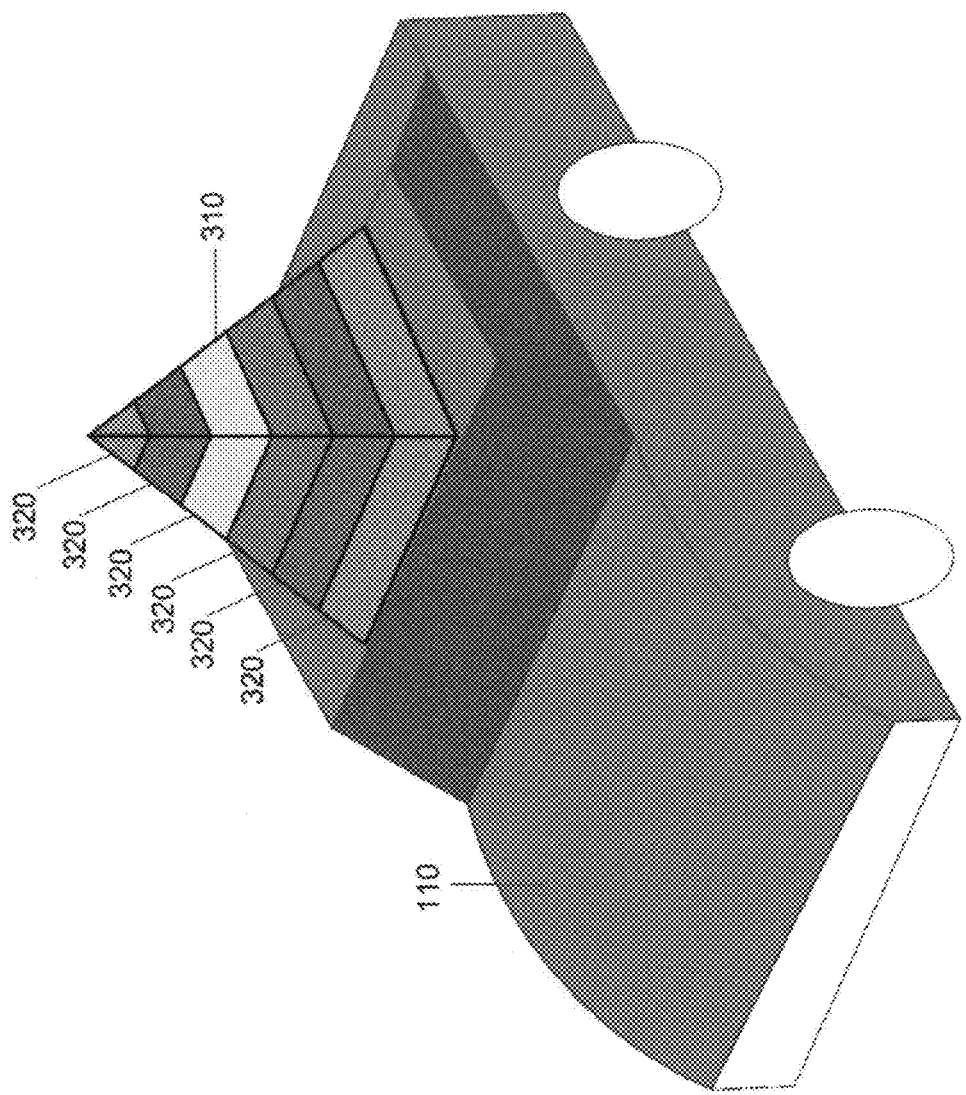
FIG. 3 is an example of a cone-shaped surface, positioned on the roof of a vehicle, which encodes information through a series of color stripes, in accordance with an embodiment of the present invention.

In a second embodiment, transmitter 220 displays encoded position information on a display surface attached to vehicle 110, and traffic controller 140 scans the display surface to retrieve the encoded position information. In this regard, reference is now made to FIG. 3, which is an example of a cone-shaped surface 310, positioned on the roof of vehicle 110, which encodes information through a series of color stripes 320, in accordance with an embodiment of the present invention. For example, with six color stripes 320 and 16 colors per stripe available, cone 310 can encode 24 bits of position and velocity information. Transmitter 220 interfaces with a display controller for cone 310, to dynamically display time-varying color stripes on cone 310. Traffic controller 140 scans the color stripes, and decodes their series of colors to derive position and velocity information.

In the individually controlled embodiment of the present invention, or in the mixed control embodiment, position transmitter 220 transmits position and velocity information for vehicle 110 to other vehicles within its vicinity, so that they can accurately identify the whereabouts of vehicle 110. In this embodiment, vehicle 110 also includes a receiver 230, which receives position and velocity information from other vehicles within its vicinity, so that vehicle 110 can identify their whereabouts. As with transmitter 220, receiver 230 may use one of many different technologies for receiving position information. Receiver 230 may include a radio receiver. Receiver 230 may include a scanner that scans color strips on cones 310.

Navigational System 240

Vehicle 110 includes an automated navigational system 240, which directs vehicle 110 to a destination designated by the passengers. Navigation system 240 may use one or more of many technologies for guiding vehicle 110 and, as such, there are several alternative embodiments of navigational system 240 within the scope of the present invention.

In the centrally controlled embodiment of the present invention, navigational system 240 determines a best route for transporting the passengers to their destination, and traffic controller 140 sends corresponding steering instructions along the best route, for avoiding collision. Steering instructions include inter alia direction and acceleration/deceleration, analogous to steering wheel and gas pedal/brake controls.

In the individually controlled embodiment of the present invention, each vehicle 110 derives its own steering instructions, based on the position and velocity information it receives from other vehicles in its vicinity.

The input to navigation system 240 is a map of a network of roads on which the vehicles move, a designated passenger destination, and traffic information. The output to navigation system is a set of steering instructions, which are input to a steering controller 250, which is used to drive vehicle 110.

Vehicle 110 is powered by a power supply 260, which is recharged when vehicle 110 is docked at one of the docking stations 130 of FIG. 1.

Figure 4:
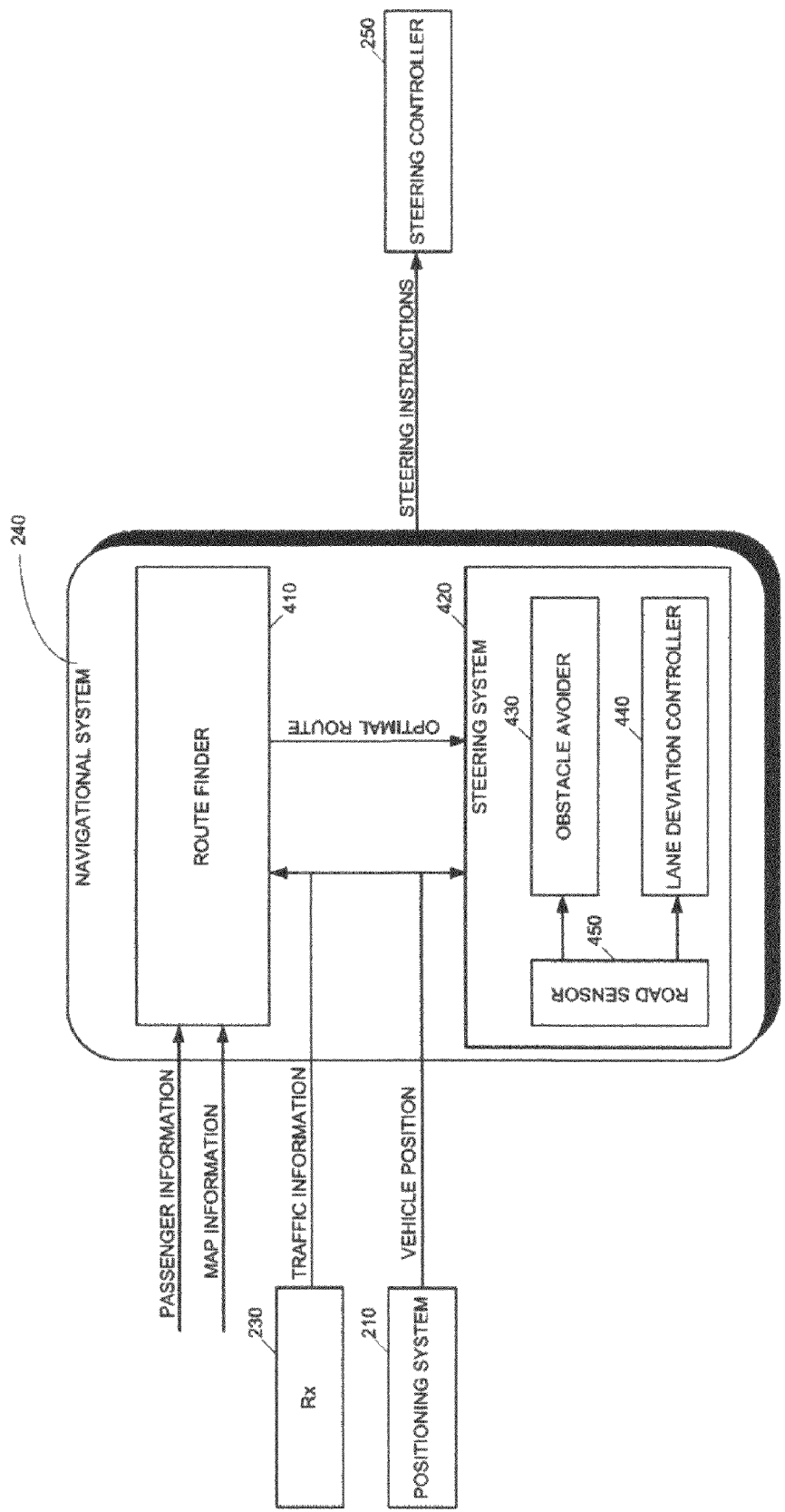
FIG. 4 is a simplified block diagram of an automated navigation system used to navigate the driver-less vehicle of FIG. 2, in accordance with an embodiment of the present invention.

Reference is now made to FIG. 4, which is a simplified block diagram of an automated navigation system used to navigate the driver-less vehicle of FIG. 2, in accordance with an embodiment of the present invention. Shown in FIG. 4 is the navigational system 240 of vehicle 110, illustrated in FIG. 2.

In the centrally controlled embodiment of the present invention, navigational system includes a route finder 410. Route finder 410 accepts as input a map of the network of roads from FIG. 1, a designated passenger destination, current position information for vehicle 110, and current traffic information. Router finder 410 produces as output an optimal travel route, to go from vehicle 110's current position to the passenger destination.

In the individually controlled embodiment of the present invention, navigational system 240 includes two primary components; namely, route finder 410 and a steering system 420.

Steering system 420 accepts as input the optimal travel route derived by route finder 410, the current position information of vehicle 110 as determined by positioning system 210, and the current position and velocity information of other vehicles as received by receiver 230 of FIG. 2. Steering system 420 produces as output steering instructions, which are transmitted to steering controller 250 of FIG. 2 and used to drive vehicle 110.

Steering system 420 may include a plurality of controllers and sensors, in accordance with different embodiments of the present invention. Steering system 420 as shown in FIG. 4 includes two controllers; namely, an obstacle avoider 430, and a lane deviation controller 440. Steering system 420 as shown in FIG. 4 includes one sensor; namely, road sensor 450.

Obstacle avoider 430 automatically detects obstacles and provides driving instructions to avoid collisions between vehicle 110 and an animate or inanimate object, such as a person or animal or tree, and between vehicle 110 and another vehicle.

Lane deviation controller 440 generally modifies the steering of vehicle 110 so that vehicle 110 runs along a single lane. Lane deviation controller 440 derives steering modifications based on information regarding structure of a lane, such as the lane's curvature.

Road sensor 450 may include any or a plurality of sensor devices, including inter alia video cameras, laser beam sensors, and ultrasonic wave sensors. Road sensor 450 generally has sufficient range and resolution to detect an obstacle with accuracy.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A transportation system, comprising:
   a network of roads for traveling to and from various destinations;
   a plurality of vehicles for transporting passengers, each vehicle situated within said network of roads, and each vehicle comprising:
      a power supply;
      a positioning system, for identifying the position of said vehicle;
      a transmitter, coupled with said positioning system, for displaying position and velocity information of said vehicle on a display surface attached to the vehicle;
      a receiver for scanning the displayed position and velocity information from other vehicles in the vicinity of said vehicle; and
      an automatic steering system, coupled with said receiver, for steering said vehicle through the network of roads without collision, in order (i) to travel to a destination designated by the at least one passenger, when said vehicle is transporting the at least one passenger, (ii) to travel to a source for picking up the at least one passenger, when said vehicle is empty, and (iii) to travel to an available docking station, when said power supply is low; and
   a plurality of docking stations, each docking station situated at a roadside of said network of roads, and each docking station comprising a charger for charging said power supply of a vehicle that is docked at the docking station;
   wherein said displayed position and velocity information is encoded as a plurality of color stripes, and wherein said receiver comprises:
      a scanner for scanning the plurality of color stripes; and
      a decoder for decoding the plurality of color stripes into position and velocity information.

2. The transportation system of claim 1 wherein said positioning system is a global positioning system.

3. The transportation system of claim 1 wherein said positioning system comprises a scanner for scanning visual patterns overlaid on said network of roads underneath the vehicle.

4. The transportation system of claim 1 wherein said automatic steering system comprises a route finder, for determining an optimal route within said network of roads to travel to the destination designated by the at least one passenger.

5. The transportation system of claim 1 wherein said automatic steering system derives steering directions and acceleration/deceleration magnitudes.

6. A transportation system, comprising:
   a network of roads for traveling to and from various destinations;
   a plurality of vehicles for transporting passengers, each vehicle situated within said network of roads, and each vehicle comprising:
      a steering system for moving the vehicle along said network of roads in accordance with steering instructions;
      a power supply;
      a positioning system, for identifying the position of said vehicle;
      a transmitter, coupled with said positioning system, for displaying position and velocity information of said vehicle; and
      a receiver, coupled with said steering system, for receiving steering instructions from the central traffic controller for said steering system;
   a plurality of docking stations, each docking station situated at a roadside of said network of roads, and each docking station comprising a charger for charging said power supply of a vehicle that is docked at the docking station; and
   a central traffic controller, comprising:
      a receiver for scanning said displayed position and velocity information from said plurality of vehicles;
      a transmitter for transmitting steering instructions to said vehicle steering systems; and
      an automatic navigational system, coupled with said receiver, for instructing said steering systems of each of said plurality of vehicles how to navigate through said network of roads without collision, in order (i) to travel to a destination designated by the at least one passenger, when such vehicle is transporting the at least one passenger, (ii) to travel to a source for picking up the at least one passenger, when such vehicle is empty and its power supply is not low, and (iii) to travel to an available docking station, when such vehicle is empty and its power supply is low;

wherein said displayed position and velocity information of the vehicle is encoded into a plurality of color stripes, and wherein said central traffic controller receiver comprises:

a scanner for scanning the plurality of color stripes; and
a decoder for decoding the plurality of color stripes into position and velocity information.

7. The transportation system of claim 6 wherein said positioning system is a global positioning system.

8. The transportation system of claim 6 wherein said positioning system comprises a scanner for scanning visual patterns overlaid on said network of roads underneath the vehicle.

9. The transportation system of claim 6 wherein said automatic navigational system comprises a route finder, for determining an optimal route within said network of roads for a vehicle to travel to the destination designated by the at least one passenger.

10. The transportation system of claim 6 wherein said vehicle further comprises a route finder, for determining an optimal route within said network of roads to travel to the destination designated by the at least one passenger.

11. The transportation system of claim 6 wherein the movement instructions include steering directions and acceleration/deceleration magnitudes.

* * * * *